United States Patent
Franke

(10) Patent No.: US 6,172,246 B1
(45) Date of Patent: *Jan. 9, 2001

(54) PROCESS FOR EXTRACTING FATTY COMPONENTS FROM COOKED FOODS

(75) Inventor: Henry L. Franke, Baton Rouge, LA (US)

(73) Assignee: University Research & Marketing Inc., Baton Rouge, LA (US)

(*) Notice: Under 35 U.S.C. 154(b), the term of this patent shall be extended for 0 days.

This patent is subject to a terminal disclaimer.

(21) Appl. No.: 09/039,370

(22) Filed: Mar. 16, 1998

Related U.S. Application Data

(60) Continuation-in-part of application No. 08/660,770, filed on Jun. 10, 1996, now Pat. No. 5,739,364, which is a division of application No. 08/256,258, filed on Jun. 30, 1994, now Pat. No. 5,525,746, which is a division of application No. PCT/US92/11394, filed on Dec. 31, 1992, which is a continuation-in-part of application No. 07/815,700, filed on Dec. 31, 1991, now Pat. No. 5,281,732.

(51) Int. Cl.⁷ .................................................. C07C 1/00
(52) U.S. Cl. ................... 554/12; 554/13; 554/9; 554/16; 554/18; 554/20; 554/21; 426/417; 426/425; 426/429; 426/442
(58) Field of Search .................. 554/9, 12, 13, 554/18, 20, 16, 21; 426/425, 417, 421, 442

*Primary Examiner*—Deborah D. Carr
(74) *Attorney, Agent, or Firm*—Henry E. Naylor

(57) ABSTRACT

A multi-stage extraction process for extracting fats and oils from cooked food products. The cooked food products can be plant-derived or animal-derived food products, particularly fried snack food products, such as potato chips. The method comprises treating the cooked food product in a two or more extraction stage with a suitable solvent at effective temperatures and pressures, wherein the food product is subjected to a vacuum between each extraction stage.

16 Claims, No Drawings

PROCESS FOR EXTRACTING FATTY COMPONENTS FROM COOKED FOODS

CROSS REFERENCE TO RELATED APPLICATIONS

This is a continuation-in-part U.S. Ser. No. 08/660,770 filed Jun. 10, 1996; now Pat. No. 5,739,364 which is a Divisional of Ser. No. 08/256,258 filed Jun. 30, 1994 now U.S. Pat. No. 5,525,746; which is a Divisional of PCT/US92/11394, filed Dec. 31, 1992; which is a Continuation-in-Part of Ser. No. 07/815,700, filed Dec. 31, 1991 now U.S. Pat. No. 5,281,732.

FIELD OF THE INVENTION

The present invention relates to a multi-stage extraction process for extracting fats and oils from cooked food products. The cooked food products can be plant-derived or animal-derived food products, particularly fried snack food products, such as potato chips. The method comprises treating the cooked food product in a two or more extraction stage with a suitable solvent at effective temperatures and pressures, wherein the food product is subjected to a vacuum between each extraction stage.

BACKGROUND OF THE INVENTION

There is a great demand for reduced fat prepared food products, especially vegetable and animal-derived fried food products, such as potato chips, fried fast food products, and cheeses. Consequently, the food industry is spending substantial sums of money to bring such products to market. One challenge, particularly for fast food producers is to make a product which is substantially reduced in fat content, but which is still appealing to consumers' taste buds. All too often, these two competing interests are mutually exclusive. There are no commercial processes available wherein vegetable and animal-based food products are first fried, then treated to remove oil, particularly the cooking oil used for frying and still have a good tasting food product. It is conventional wisdom in the food industry that in order to produce a reduced fat food product a process other than frying in cooking oil must be used.

There have been numerous processes proposed to produce snack food products having the palate appeal of fried food products, but being substantially fat-free. Unfortunately, none of these processes has met with a great deal of success. The typical commercial process attempts to produce a food product, such as potato chips without frying, but which they hope will have the flavor of fried products.

For example, U.S. Pat. No. 4,756,916 teaches a process for producing low-fat potato chips comprising washing potato slices with an aqueous solution, then applying oil to the washed slices to coat the slices with oil. The amount of oil applied to the washed slices is adjusted to achieve an oil content of about 10 to 25 wt. % in the final product. The oil coated slices are blanched, essentially pre-frying the slices due to the oil coating, then baked at a temperature of at least about 390° F. to partially dry the slices. The partially dried potato slices are then baked at a temperature of about 290° F. (140° C.) to 320° F. (160° C.) to finish drying the slices.

Another technique is taught in U.S. Pat. No. 4,906,483 which is directed to a process for producing potato products having no-fat, no-cholesterol, and no salt ingredient characteristics. This is done by placing a pan, containing previously rinsed and sliced potatoes submerged in water, into a microwave oven until the submerged potatoes are visibly transparent. The hot water is then replaced with cold water to remove visible starch. The potatoes are rinsed and arranged on a non-stick cooking sheet and placed in a conventional oven for browning and crisping. Such a process fails to achieve the taste benefits that would be derived from frying the potatoes in cooking oil. Furthermore, extra steps are needed wherein a microwave and a conventional oven are used. Similarly, U.S. Pat. No. 5,202,139 discloses a process for preparing essentially fat-free potato chips. The process involves slicing and washing raw potatoes, pre-drying and arranging the sliced potatoes on a conveyor, then exposing them to a high intensity microwave field. The potato slices are then seasoned and exposed to a lower intensity microwave field. Such a process is not only limited by the fact that it does not achieve the taste advantage from frying, but the process itself is limited to producing only a single layer of product at a time. This limitation is due to the nature of microwave cooking and thus will result in less efficient chip production than a process that can cook or fry multiple layers of sliced food product.

Further, U.S. Pat. No. 4,919,965 discloses a method of toasting agricultural produce slices and, more particularly, potato slices. The toasting process takes place by the use of compressive, opposed, contact surfaces, which toast the sliced produce in a fat and oil-free environment. More specifically, the process of this reference includes washing raw agricultural produce, then slicing the produce into thin slices. A seasoning is then applied to the slices which are then cooked under heat and pressure imposed between an opposing pair of heating surfaces to drive out moisture and toast the slices.

Also, U.S. Pat. No. 4,873,093 discloses a product and process for preparing a baked snack food from gelatinized starch ingredients wherein at least one ingredient having starch, such as potatoes, is mixed with water to form a composition which is steamed to form a dough-like consistency. The dough-like composition is then machined to form pieces, which are baked in a conventional oven. The exterior layer of the dough-like composition cooks rapidly during baking and traps steam in the interior portion of the dough. An alternative embodiment includes spraying vegetable oil onto the pieces prior to baking to obtain a final product having a flat, oil-containing cracker-like appearance. A post-bake oil application is optional and included in a preferred embodiment.

U.S. Pat. No. 5,298,707 teaches a process and apparatus for preparing fat-free snack chips by exposing sliced raw potatoes, and the like, to a high intensity microwave field that rapidly converts moisture within the slice to steam. The exposed slices are then dried by longer exposure to a lower energy microwave field with an elaborate microwave apparatus. The resulting chip product, which has not been fried in oil, will lack the flavor, which appeals to the typical consumer of snack foods.

Another attempt at making fat-free snack foods is taught in U.S. Pat. No. 5,370,838 which discloses a process for producing food chip products which does not involve oil-based cooking. The process includes slicing and/or shaping a food, such as potatoes, then washing starch from the sliced, or shaped food, with water then forming multiple layers of the food product. The multiple-layered food product is baked in an impingement oven under conditions sufficient to form a fluidized bed of layered food product. The pressure is varied within the impingement oven to further release moisture. After baking, the shaped food forms are dried and optionally seasoned. This process, like those previously discussed, fails to produce a fried snack product substantially free of oil and which still has most, of not all, of the flavor generated by the frying step.

Therefore, there is a substantial need and commercial demand in the art for a process which is able to produce a prepared food product, such as a fried food product, that is substantially free of oils and fats and which still has significant taste appeal to the typical snack food consumer.

SUMMARY OF THE INVENTION

In accordance with the present invention, there is provided a multi-stage process for reducing the amount of oil from an oil-containing cooked food product selected from agricultural and animal-derived food products, which process comprises:

(a) introducing the oil-containing food product into an extraction zone;

(b) introducing an effective solvent into said extraction zone;

(c) maintaining said solvent in contact with said food product at an effective temperature and pressure so that the solvent is in liquid form, and for an effective amount of time to remove a fraction of the oil, thereby resulting in a partially extracted food product;

(d) passing the resulting oil-laden solvent, in liquid form, from said extraction zone to a separation zone, wherein solvent is separated from the oil for recycle to the extraction zone;

(e) collecting the oil from the separation zone;

(f) reducing the pressure of said extraction zone to a point where at least a fraction of any remaining solvent will vaporize;

(g) introducing an effective solvent into said extraction zone;

(h) maintaining said solvent in contact with said partially extracted food product at an effective temperature and pressure so that the solvent is in liquid form, and for an effective amount of time to remove a predetermined amount of oil;

(i) passing the resulting oil-laden solvent, in a liquid form, from said extraction zone to a separation zone, wherein solvent is separated from the oil for recycle to the extraction zone;

(j) collecting the oil from the separation zone;

(k) reducing the pressure of said extraction zone to a point where at least a fraction of any remaining solvent is vaporized;

(l) repeating steps (g) through (k) until the desired level of oil extraction of said food product is reached; and (m) removing the extracted food product from the extraction zone.

In a preferred embodiment of the present invention the oil-laden solvent is passed from one or more extraction stages by heating the extraction zone, thereby increasing the pressure in said extraction zone to an effective degree to cause the oil-laden solvent to flow into the separation zone.

In another preferred embodiment of the present invention an inert gas is introduced into said extraction zone after the partially extracted food product has been subjected to a vacuum in one or more extraction stages.

In other preferred embodiments of the present invention the food product is cheese.

In still other preferred embodiments of the present invention, the food product is an agricultural food product selected from fried snack foods, more preferably potato chips and corn chips.

In yet another preferred embodiment of the present invention, the normally gaseous solvent is selected from methane, ethane, propane, butane, isobutane, butylene, hexane, sulfur dioxide, carbon dioxide, $CHF_3$, $CClF_3$, $CFBr_3$, $CF_2=CH_2$, $CF_3-CF_2-CF_3$, $CF_4$, $CF_4$, $CH_3-CF_3$, $CHCl_2$, ammonia, nitrogen, nitrous oxide, dichlorodifluor methane, dimethylether, $C_1-C_4$ alkyl acetates, methyl fluoride, and halogenated hydrocarbons which are normally gaseous.

In still another preferred embodiment of the present invention, the extraction zone is evacuated and flushed with an inert gas prior to introduction of the food product.

In yet other preferred embodiments of the present invention, an inert gas is used to displace the solvent in the extraction zone as it is passed from the extraction zone to the separation zone.

In another preferred embodiment of the present invention, the extraction zone is subjected to conditions, which will repeatedly stress and relax the oil and/or solvent molecules.

In still other preferred embodiments of the present invention, the oil-extracted food product is subjected to microwaves in other to aid in the removal of residual amounts of solvent from the substantially de-oiled product.

DETAILED DESCRIPTION OF THE INVENTION

Any oil-bearing cooked food product can be used in the practice of the present invention. The food product will typically be an agricultural or animal derived food product, but it can also be a nutraceutical/pharmaceutical material. The term "oil-bearing agricultural food product", as used herein refers to any food product which contains oil and which is grown as a crop. The oil can be inherent in the food or it can be extraneous oil, which is adsorbed and/or absorbed during a cooking process, particularly by frying in a cooking oil. Preferred agricultural food products are those which can typically be reshaped directly from the raw state. Such foods include bananas, plantains, potatoes, yams, turnips, and sweet potatoes, and the like. Other foods, such as rice and corn, can also be manipulated to form slices and can also be used in the process of the present invention. For example, corn food products can be popcorn, which is cooked in hot oil, or can be prepared initially by forming a dough from water and corn flour. The dough can then be extruded, and cut into the desired shape for frying. There are many variations on this basic procedure for manipulating flour or dough into a shape suitable for frying. For example, see U.S. Pat. Nos. 3,600,193 (mixing corn flour with seasonings); U.S. Pat. No. 3,922,370 (mixing water, rice, and rice flour); and U.S. Pat. No. 3,348,950) mixing corn, sucrose, water, and corn grits), all of which are incorporated herein by reference. Generally, the process of the present invention can be used with all foods that are cooked, preferably fried, in oil. The term "fried" as used herein means to cook in hot oil or fat. Consequently, the terms "cooked" and "fried" are used interchangeably in this application. It is to be understood that the terms "oil" and "fat" are used interchangeably herein. Oils are typically a liquid at room temperature and fats are typically a solid at room temperature. Further, the term "fat-free", as defined by the United States Food and Drug Administration means a food product containing less than about 0.5 wt. % fat, based on the total weight of the food product. The process of the present invention will work substantially equally for both oils and fats. In other words, the present invention will be used on any agricultural food product that contains oil as an inherent constituent, or which was previously cooked in fat or oil and has picked-up cooking oil during cooking. The term "animal-derived", as used herein refers to any food product which is derived from the animal kingdom; preferably the vertebrates, such as fish, mammals, and birds; and the arthropods, preferably the crustaceans, such as lobsters, crabs, and shrimp. Also included in the term "animal-derived" are dairy products, preferably cheeses. Other preferred animal-derived food products include bacon, and pork rinds.

It is within the scope of the present invention that fat substitutes can also be extracted from foods cooked therein, as long as it is at least partially soluble in the solvent for its removal. Preferred are fat substitutes, which are suitable for use at cooking and frying temperatures. The term "fat substitute", as used herein means any edible material which is substantially non-digestible, which has the mouth feel of dietary fat, and which can be used in a food preparation process where fat or oil (i.e., triglyceride fat) is normally employed, in total or partial replacement. By "nondigestible" is meant that only about 70% or less, preferably only about 20% or less, and more preferably only about 1% or less of such materials can be digested by the human body. Alternatively, "nondigestible" can also mean that only about 70% or less, preferably only about 20% or less, more preferably only about 1% or less, of a material can be hydrolyzed, versus a triglyceride, by the enzymes in the lipase test described in US Pat. No. 5,422,131 to Proctor and Gamble, which is incorporated herein by reference.

Any suitable cooking technique using oil and/or fat can be used for the food product of the present invention. Typically the food product, if an animal-derived food product, will be a so-call "fast food" such as hamburgers (chopped meat), bacon, fried chicken, pork rinds, and fried fish products. If the food product is an agricultural food product, it will preferably be a potato or corn based product, more preferably potato chips and corn chips. The thrust of the present invention is not with the actual cooking, or frying, of the food product, but with removing oils and fats after cooking, without substantially altering the taste of the product. By the practice of the preferred mode of the present invention, the food product is first fried in oil by any conventional means to ensure superior flavor—then the oil is removed. The oil is removed by use of what applicant refers to as "cold extraction". That is, the food product, after frying, is contacted with a normally gaseous solvent at relatively low temperatures.

Solvents suitable for use in the present invention are effective solvents. That is, which is a liquid at extraction conditions, and in which the compound to be extracted is soluble under extraction conditions. It is preferred that the solvent be non-toxic (eatable). Preferred solvents are those which are normally gaseous at typical atmospheric conditions. That is, those which are a gas at about room temperature (about 70° F.) and atmospheric pressure. Non-limiting examples of preferred solvents include methane, ethane, ethylene, propylene propane, butane, isobutane, butylene, hexane, sulfur dioxide, nitrous oxide, carbon dioxide, $CHF_3$, $CClF_3$, $CFBr_3$, $CF_2=CH_2$, $CF_3-CF_2-CF_3$, $CF_4$, $CF_4$, $CH_3-CF_3$, $CHCl_2$, ammonia, nitrogen, nitrous oxide, dichlorodifluor methane, dimethylether, $C_1-C_4$ alkyl acetates, methyl fluoride, and halogenated hydrocarbons which are normally gaseous. Preferred are of methane, ethane, isobutane, sulfur dioxide, nitrogen oxides, methyl acetate, and ethyl acetate. More preferred are isobutane, sulfur oxides, and methyl acetate. The weight ratio of solvent to agricultural food product will be from about 1:1 to 2:1, preferably from about 1.2:1 to 1.5:1. A co-solvent, such as a $C_2$ to $C_6$ alcohol, preferably ethanol, may be used. If a co-solvent is used it may be used in place of at least about 5 to 90 vol. %, preferably about 5 to 50 vol. %, and more preferably from about 5 to 25 vol. %, of the primary solvent.

The apparatus used in the practice of the present invention, in its simplest form, will contain an extraction zone, a separation zone, and a storage vessel for the solvent. The process of the present invention is practiced by introducing the cooked food product into the extraction zone. The extraction zone can be comprised of one or more vessels suitable for the volumes, temperatures, and pressures employed. It may be preferred to use more than one extraction zone. In this way, while one extraction zone is in the extraction stage, another extraction zone, which has previously undergone extraction, can be unloaded of reduced oil-containing product, then reloaded with another charge of cooked food product to start another extraction cycle. Non limiting types of vessels, which may be used for the extraction zone, include fixed-bed, slurry-bed, moving-bed vessels, as well as vessels in which the food product is fed therethrough on a belt, or with a screw, or on or in a bucket. It is preferred that the vessel be one in which a fixed-bed of food product can be loaded. The food product is preferably fed into the extraction zone so as to form a fixed-bed of food product. Although there can be more than one extraction zone, it is important for the purposes of the present invention that each batch of cooked food product be subjected to more than one extraction cycle, or stage. In between each stage the resulting oil-laden solvent is passed to a separation zone and the partially extracted cooked food product is then subjected to one or more additional extraction cycles, depending on the level of extraction one wishes to achieve.

Although not critical, it is preferred to evacuate the extraction zone prior to introduction of solvent, especially if the solvent is solvent like propane, which could possibly form an explosive mixture with air. The evacuation can be conducted in any suitable manner, such as, by use of a vacuum pump or by merely venting the air into the atmosphere as it is displaced by the solvent during solvent loading. Of course, any combustible solvent, which contaminates the vented air, can be burned-off during venting. It is also within the scope of the present invention that the extraction zone be flushed with an inert gas, preferably nitrogen, prior to introduction of the solvent. It is preferred that the inert gas be heated, for example at a temperature from about 40° to 200° F., preferably from about 80° F. to 150° F. This heated inert gas flush will serve to evacuate the extraction zone of air as well as heating, or drying the food product. It is preferred that the food product be dry before being contacted with the solvent in order to mitigate, or prevent, freezing which may occur during certain stages of this process. While the heated inert gas can be used to dry the food product, it may also be dried by any other appropriate means, such as by heating it by conventional means, including the use of microwaves. Furthermore, after flushing the extraction zone with inert gas, the inert gas can be used to pressurize the extraction zone so that when the normally gaseous solvent is introduced into the extraction zone it is immediately transformed to the liquid state.

The normally gaseous solvent is typically fed into the extraction zone in a gaseous state. Although the extraction can be performed with the solvent in a gaseous state, a suitable pressure and temperature is preferably applied to cause the normally gaseous solvent to liquefy. It is also within the scope of this invention that the normally gaseous solvent be introduced into the extraction zone already in a liquid state. Also within the scope of the present invention is to introduce the solvent into the extraction zone in the form of a mist or spray. The conditions of extraction are sub-critical conditions. That is, the solvent during extraction will be in a form that can be considered a true vapor state or a true liquid state. At critical conditions, the temperature and pressure are such that the liquid and gaseous phases of a pure stable substance become identical. Typically, the temperature will be from about ambient temperature (22° F.), up to about 140° F., preferably from about 70° F. to 130° F., although higher or lower temperatures may also be used. Of course, these temperatures may vary for any given food product and solvent combination, and the precise conditions are within the skill of those having ordinary skill in the art given the teaching herein. The pressure maintained in the extraction zone will be a pressure that is effective for maintaining the solvent as a gas or a liquid, preferably a liquid, in a sub-critical state. While this pressure will be dependent on such things as the particular solvent and temperature employed, it will typically range from less than atmospheric pressures to about 200 psig, preferably from about 15 psig to 200 psig, more preferably from about 100 psig to 140 psig, when a solvent such as propane is used.

The extraction zone can also be subjected to conditions, which will repeatedly stress and relax the oil and/or solvent molecules. Such stressing and relaxation can be caused by fluctuating the pressure of the extraction zone by at least about ¼ psig, preferably by at least about ½ psig, more preferably by at least 1 psig, and most preferably by at least 5 psig. This pressure fluctuation can be caused by actuating and deactuating a piston or diaphragm in the pressure or solvent line. The stressing and relaxation conditions can also be caused by sonication. That is, by subjecting the ingredients of the extraction zone to sonic energy.

The extraction of the present invention will be accomplished in more than one extraction. That is, the food product will undergo two or more extractions with solvent in order to assure a more efficient extraction of oil. For example, a first extraction may leave as much as 3 to 10 vol. % of the oil in the food product. A substantial amount of this residual oil can then be removed by subjecting the food product to at least one more extraction. Of course, the economics of the process must be considered so that the cost of additional extractions does not exceed the value of the added products from the additional extractions.

The food product will preferably be placed on a porous means, such as a screen, or membrane filter, or perforated tray, through which the solvent and extracted oil can pass. It is to be understood that an alternative process feature is one wherein the filtering means is situated between the extraction zone and the separation zone. The solvent is maintained in contact with the food product for an effective period of time. That is, for a period of time which will result in the extraction of a predetermined amount of oil.

After extraction, the solvent/oil mixture is passed from the extraction zone to a separation zone. If the solvent in the extraction zone is in the liquid phase, then it is preferred that the solvent be passed to the separation zone under conditions that will maintain the solvent as a liquid. This can be accomplished in several ways. For example, the extraction zone can be heated to cause an increase in pressure so that the solvent/oil mixture is forced out of the extraction zone and into the separation zone. After substantially all of the solvent/oil mixture is passed to the separation zone the extraction zone is sealed off from the separation zone. One reason to move the solvent/oil mixture to the separation zone in a liquid state is to prevent unnecessary evaporation of solvent resulting in freezing of the extracted material. Another way cause the solvent/oil mixture to pass from the extraction zone to the separation zone is to introduce a flush gas, preferably an inert gas such as nitrogen, into the extraction zone to replace the leaving solvent/oil mixture. By "inert gas" is meant a gas, which will not have a deleterious effect on the food product, or extracted oil, which can be recycled for cooking a fresh batch of food product. It will preferably be gas in which the oil is substantially not soluble, either when the gas is in a gaseous form or if it should liquefy under process conditions. The flush gas will also preferably be one, which is dissimilar to the solvent used herein. For example, it will be a gas, which at a given temperature will liquefy at a higher pressure than the solvent. In other words, it is preferred that the inert gas be a gas and not a liquid at extraction conditions. The flush gas replaces the solvent/oil mixture in the extraction zone and maintains substantially the same pressure throughout the solvent/oil removal step. It is preferred that the flush gas be heated. That is, that it be at a temperature that will cause the extracted food product to be from about 90° F. to 140° F., preferably from about 100° F. to 120° F. This heated flush gas can enhance the recovery of any residual oil and solvent left in the de-oiled food product. It is also within the scope of this invention that solvent vapor be passed through the de-oiled food product either in place of the flush gas or following the passage of flush gas. This solvent vapor will act to remove at least a portion of the residual oil left in the de-oiled food product. Any remaining solvent can be removed from the final product by use of a vacuum or flushing with a gas such as nitrogen. It is also within the scope of the present invention to use microwaves to remove residual amounts of solvent from the de-oiled food product.

The separation zone is run under conditions, which will enhance the separation of solvent from the oil. It is preferred that heat be applied to enhance this separation. Other conditions for operating the separation zone to enhance solvent/oil separation include distillation, centrifugation, and reduced pressures. The separated solvent is then passed to a storage zone where it can be recycled to the extraction zone. Makeup solvent, if needed, can be added. At least a portion of the recovered solvent can be recycled directly to the extraction zone.

After the cooked food product has been extracted and the extraction zone isolated from the separation zone after passage of the solvent/oil mixture to the separation zone, the extraction zone is reduced in pressure to a point where at least a fraction of the solvent vaporizes. It is preferred that the extraction zone be reduced in pressure to a pressure less than about 10 psig, more preferably to a pressure about 0 psig, and most preferably to a pressure wherein the extraction zone is under vacuum. The temperature of the extraction zone can also be increased during this reduced pressure stage, or it can be increased first followed by reducing the pressure. Further, an inert gas can also be introduced into the extraction zone during this reduced pressure stage. At this point, the partially extracted food product is ready for another extraction stage. This can be accomplished in several ways. One way would be to first introduce an inert gas, as described above, followed by the introduction of the solvent to start another extraction, separation cycle. Another way would be to induce the solvent again, without first introducing an inert gas. This cycle can be repeated as many time as needed to reach a predetermined low oil level in the food product. It is preferred that the cooked food product be subjected to more than two extraction stages.

Various ingredients can be added to the food product either during or after extraction. Non-limiting examples of ingredients that can be added include vitamins and flavorings, including salt. Any suitable method can be used to add the ingredients to the food product. For example, after extraction flavoring can be added to the substantially oil free food product by spaying the extracted food product with a light layer of oil containing the desired flavor. Flavoring can also be added during extraction by including the flavoring in the solvent used to extract the oil from the food product. It as been found by the inventor hereof that when flavoring is added to the solvent, at least some of the flavoring remains on the food product after extraction. The flavoring can also be added after extraction by passing additional flavor-containing solvent over the food product before removal from the extraction zone.

The present invention can be more fully understood by reference to the following examples which are not to be taken as being limited in anyway, and which are presented to illustrate the present invention.

PROCEDURE FOR EXAMPLES 1–11

Various fried agricultural snack food products were purchased in retail stores and used in the examples below to demonstrate that the present invention is effective for removing fats and oils from previously fried agricultural food products. The food products, after treatment, had substantially less fat than the original fried product. If desired, the product can be made fat-free. One of the unexpected findings of the present invention is that the flavor of the original fried product underwent little, if any, change during the oil extraction process. Most of the data of these examples is based on the oil content of the product as set forth by the manufacturer on the package of each product.

Example 1

200.6 g. of fried potato chips containing approximately 56.7 g. of oil (as reported by the manufacturer) was placed into an extraction zone. The extraction zone was evacuated then propane vapor was flowed through the bed of potato chips for a period of 35 minutes at a temperature of about 90° F. and at a pressure of about 160 psig. After 35 minutes, the flow of propane was stopped, the extraction zone vented of propane, and the so-treated potato chips were weighed. It was found that about 35 g. of the total 56.7 g. of oil had been extracted. 95.9 g. of the treated potato chips were returned to the extraction zone and subjected to another extraction cycle at essentially the same temperature and pressure as the first cycle, except that the cycle length was 25 minutes instead of 35 minutes. It was found that after this second cycle the potato chips were essentially fat-free. That is, they had less than about 0.5 g per serving of fat, or oil.

Example 2

A 97.9 g. charge of fried potato chips containing approximately 27.67 g. of oil, (as reported by the manufacturer) was placed into an extraction zone. The extraction zone was evacuated, then flushed with nitrogen. Propane was introduced into the extraction zone at a pressure, which caused the propane to be in the liquid phase. The liquid propane was held in contact with the charge of potato chips for about 5 to 10 minutes at a temperature of about 75° F. and a pressure of about 150 psig. Nitrogen was then used to move the propane, and any extracted oil, to a separation zone under conditions, which kept the propane in the liquid phase. The potato chips were removed from the extraction zone, weighed, and it was found that substantially all of the oil was extracted. Thus, the potato chips can be classified as "fat-free".

Example 3

50.3 g. of fried potato chips containing about 14.22 g. oil was charged to an extraction zone. Propane was added, without first evacuating the extraction zone, under conditions so that the propane was in liquid phase. The propane was in contact with the potato chip charge for a period of about 7 minutes at temperatures from about 64° F. to about 40° F. and a pressure of about 115 psig. After extraction, the propane was vented. The treated potato chips were found to weigh 40.6 g. with about 68% of the oil being removed. This example demonstrates that even with a single cycle of solvent treatment, even without a nitrogen flush and pressure fluctuation during extraction, a substantial amount of oil from the fried potato chips can still be removed by the practice of the present invention.

Example 4

52.6 g. of fried potato chips containing about 14.87 g. of oil (as reported by the manufacturer) were charged to an extraction zone. Propane was introduced into the extraction zone without first evacuating the extraction zone of air. The propane was held in contact with the potato chip charge for a period of 5.5 minutes at temperatures from about 72° F. to about 36° F. at pressures from about 110 psig to about 135 psig. The pressure in the extraction zone was periodically fluctuated from 110 psig to 135 psig during extraction. After extraction the extracted potato chips were found to weigh 38.9 g. with over 90% of the oil being removed.

Example 5

264.5 g. of fried corn chips were charged to an extraction zone where they were extracted, in accordance to the procedure set forth in Example 2 above except that the temperature was from about 78° F. to about 60° F. and the pressure from about 160 psig to about 130 psig, and the pressure in the extraction zone was pulsed from 1 to 50 psig during extraction. After one cycle of extraction the corn chips were found to weigh 178.2 g. with a substantial amount of oil being removed.

Example 6

734.4 g of fried potato sticks were charged into an extraction zone and extracted in accordance with the procedure set forth in Example 8 above. After extraction the fried potato sticks were weighed and it was found that they weighed 527.8 g. and that a substantial amount of the oil had been extracted.

Example 7

243.3 g. of Cheese Cheetos (a corn meal based product with cheese flavoring) was charged into an extraction zone. The oil content was 77.3 g. as reported by the manufacturer. The extraction zone was evacuated and propane vapor was passed through the extraction zone, with pulsing, for a period of 35 minutes. The temperature during this first stage extraction was between 98° F. and 88° F. with the pressure being periodically pulsed between 170 psig and 130 psig. At the end of the this first stage extraction (35 minutes) the extraction zone was vented and the charge of Cheetos was weighed and it was found that 53.9 g. of oil had been removed. The charge was then put back into the extraction zone and another extraction cycle was run under the same conditions as the first cycle, except the time of this second cycle was for 10 minutes. Both extraction stages were run with propane vapor, as opposed to liquid propane. At the end of the second extraction cycle, after all solvent had been removed from the extraction zone, a vacuum was pulled on the extraction zone, then flushed with a flow of nitrogen at 85° F. to remove any remaining traces of solvent from the charge. The final product was weighed and it was found that a total of 72.8 g. of oil was extracted out of a total of 77.3 g.

Example 8

152.5 g. of no salt potato chips (fried) containing 43.98 g. of oil was placed in an extraction zone. The extraction zone was evacuated and propane vapor was passed through the extraction zone, with pulsing, for a period of 19 minutes. The temperature during this first stage extraction was between 90° F. and 95° F. with the pressure being periodically pulsed between 175 psig and 132 psig. At the end of the this first stage extraction, the extraction zone was vented and the charge of potato chips was weighed and it found that 33 g. (75%) of oil had been removed. The charge was then put back into the extraction zone and another extraction cycle was run under the same conditions as the first cycle, except the time of this second cycle was for another 19 minutes. Both extraction stages were run with propane vapor, as opposed to liquid propane. At the end of the second extraction cycle, after all solvent had been removed from the extraction zone, a vacuum was pulled on the extraction zone and it was flushed with a flow of nitrogen at 80° F. to remove any remaining traces of solvent from the chips. The final product was weighed and it was found that a total of 41.9 g. (>95%) of the oil was extracted out of a total of 43.98 g.

Example 9

141.1 g. of potato chips (Zapp's) containing 40 g. of oil as reported by the manufacturer, was placed in an extraction zone. The extraction zone was then flushed with a mixture of air and nitrogen. Propane was then continuously sprayed onto the potato chips at 140 psig for a period of 8 minutes with continuous recycle of solvent. The propane was passed to a separation zone where oil was removed from the oil/solvent mixture, then again sprayed into the extraction zone at a temperature of 140° F. and again passed through the bed of potato chips for another 8 minute cycle. This cycle was repeated one more time for a total of three 8-minute cycles. At the end of the three cycles it was found that 39.4 g. (98.5%) of oil was removed. Thus, the final fried potato chip product, after extraction in accordance with the process of the present invention, can be classified as "fat free".

Example 10

141.5 g of Zapp's Sour Cream Potato Chips was placed in an extraction zone. The oil content as reported by the manufacturer was 40 g. The chips were extracted with a mixture of $CO_2$ and $N_2$ at a volume ratio of 13:1 respectively. The temperature of extraction was 120° F. and the time period was 38 minutes. After extraction it was found that only 12 g. of oil were removed (30%). The chips were subjected to an additional extraction step wherein they were flushed with hot nitrogen (110° F.), and pulled within the pressure range of about 25 psig 200 psig, for a period of 17 minutes. It was found that only a total of 19.6 g. of oil was removed at the end of both extraction stages. Thus, $CO_2$ does not appear to be as effective a solvent as propane for the removal of oil from fried snack foods, such as potato chips.

Example 11

A sample of fried shrimp containing 23.8 wt. % oil was placed into an extraction zone, which had first been evacuated of air. Propane was fed into the extraction zone under conditions so that the propane was in the liquid phase during extraction. The pressure in the extraction zone was periodically pulsed during extraction by at least about 10 psig. The temperature of extraction was between 70° and 80° F. and the pressure was between about 130 psig and 200 psig. After extraction, the propane was removed from the extraction zone with a nitrogen purge. The fried shrimp was than analyzed and it was found that about 90% of the oil had been removed with no appreciable change in taste.

Example 12

411.4 grams of fried potato chips, having substantially the same oil content as the fried potato chips used in the above examples, were put into a stainless steel basket and placed in an extraction vessel. The extraction vessel was closed and substantially all of the air was removed by applying a vacuum to 28" Hg. The vacuum was maintained for one minute. The extraction vessel was then filled with liquid propane. Approximately 3,800 cc of propane was required to assure that the chips were covered with propane. The chips were statically processed for 24 hours. The propane was then removed from the extraction vessel. A vacuum was applied to remove residual propane. The chips were removed from the extraction vessel and the amount of oil removed determined.

The chips prior to processing were found to contain 36.25% crude fat or 10.15 grams per 28 grams serving, a full fat chip.

The chips were found to contain 4.87% crude fat or 1.36 grams per 28 gram serving. This is considered a low fat chip. Note: that an exhaustive single extraction did not provide a "No Fat" potato chip product of less than 0.5 grams per serving or 1.78% for a 28 gram serving.

Example 13

413.8 grams of fried potato chips were extracted as in example 12.

The chips prior to processing were found to contain 36.25% crude fat or 10.15 grams per 28 grams serving, a full fat chip.

The chips after 2.5 hours extraction were found to contain 6.93% of crude fat or 1.94 grams per 28 gram serving. This is also a low fat potato chip.

Example 14

410.5 grams of fried potato chips were extracted as in example 12 except the process time was reduced to 30 minutes.

The chips prior to processing were found to contain 36.25% crude fat or 10.15 grams per 28 grams serving, a full fat chip.

The chips after 0.5 hours or 30 minutes extraction were found to contain 9.06% crude fat or 2.53 grams per 28 gram serving, also a low fat chip. This example illustrates the exponential removal of fat with approximately 75% of the fat being removed in 2.5 hours extracted in the first 30 minutes.

Example 15 (An example of two 30 minute extraction with a drain/vacuum/refill step in between)

414.1 grams of fried potato chips were extracted as in example 12. At the end of 30 minutes processing, the propane solvent was drained from the reactor and a 20" Hg vacuum was applied. The reactor was then refilled with clean solvent and processed for an additional 30 minutes. The propane was drained from the reactor and residual solvent removed as in a by application of a vacuum.

The chips prior to processing were found to contain 36.25% crude fat or 10.15 grams per 28 grams serving, a full fat chip.

The chips after processing were assayed to contain 4.94% crude fat or 1.38 grams per 28 gram serving, a very low fat chip.

This examples illustrates the unexpected advantages of a multi-stage extraction with inter-stage reduction in pressure, preferably a vacuum, of the extraction vessel and extracted product.

What is claimed is:

1. A multi-stage process for reducing the amount of oil from an oil-containing cooked food product selected from agricultural and animal-derived food products, which process comprises:

(a) introducing the oil-containing food product into an extraction zone;

(b) introducing an effective solvent into said extraction zone;

(c) maintaining said solvent in contact with said food product at an effective temperature and pressure so that the solvent is in liquid form, and for an effective amount of time to remove a fraction of the oil, thereby resulting in a partially extracted food product;

(d) passing the resulting oil-laden solvent, in liquid form, from said extraction zone to a separation zone, wherein solvent is separated from the oil for recycle to the extraction zone;

(e) collecting the oil from the separation zone;

(f) reducing the pressure of said extraction zone to a point where at least a fraction of any remaining solvent will vaporize;

(g) introducing an effective solvent into said extraction zone;

(h) maintaining said solvent in contact with said partially extracted food product at an effective temperature and pressure so that the solvent is in liquid form, and for an effective amount of time to remove a predetermined amount of oil;

(i) passing the resulting oil-laden solvent, in a liquid form, from said extraction zone to a separation zone, wherein solvent is separated from the oil for recycle to the extraction zone;

(j) collecting the oil from the separation zone;

(k) reducing the pressure of said extraction zone to a point where at least a fraction of any remaining solvent is vaporized;

(l) repeating steps (g) through (k) until the desired level of oil extraction of said food product is reached; and (m) removing the extracted food product from the extraction zone.

2. The process of claim 1 wherein the solvent is a normally gaseous solvent.

3. The process of claim 2 wherein the oil-laden solvent is passed from one or more extraction stages by heating the extraction zone thereby causing a fraction of the solvent to vaporize and increase the pressure in said extraction zone to an effective degree to cause the oil-laden solvent to flow into the separation zone.

4. The process of claim 3 wherein an inert gas is introduced into said extraction after one or more extraction stages and after said one or more extraction zones have been subjected to a vacuum.

5. The process of claim 2 wherein the solvent is in a liquid phase in the extraction zone.

6. The process of claim 2 wherein the solvent is in the gaseous phase in the extraction zone.

7. The process of claim 2 wherein the food product is an animal-derived food product selected from animals from the group consisting of beef, pork, fish, and birds.

8. The process of claim 7 wherein the food product is pork rinds.

9. The process of claim 2 wherein the food product is an agricultural food product.

10. The process of claim 9 wherein the agricultural food product is a fried snack food based on a food selected from the group consisting of potatoes and corn.

11. The process of claim 2 wherein the solvent is selected from the group consisting of propane, butane, and mixtures thereof.

12. The process of claim 2 wherein the temperature during extraction is from about 60° to 140° F.

13. The process of claim 2 wherein the pressure in the extraction zone during extraction is fluctuated from about 0.25 psig to 50 psig.

14. The process of claim 2 wherein any residual solvent remaining in the food product of reduced oil content is removed by a process selected from the group consisting of: (a) subjecting it to microwaves; (b) contacting it with an inert gas; and (c) subjecting it to a vacuum.

15. The process of claim 2 wherein the oil extracted is a oil-substitute.

16. The process of claim 2 wherein the food product is a cheese.

* * * * *